United States Patent
Tokumoto et al.

(10) Patent No.: US 7,293,472 B2
(45) Date of Patent: Nov. 13, 2007

(54) TORQUE DETECTING APPARATUS

(75) Inventors: Yoshitomo Tokumoto, Nabari (JP);
Toshiharu Ishihara, Kashiwara (JP);
Naoki Nakane, Toyota (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 98 days.

(21) Appl. No.: 11/332,714

(22) Filed: Jan. 13, 2006

(65) Prior Publication Data
US 2006/0156834 A1 Jul. 20, 2006

(30) Foreign Application Priority Data
Jan. 20, 2005 (JP) ............................. 2005-012999

(51) Int. Cl.
*G01L 3/10* (2006.01)
(52) U.S. Cl. ............................. 73/862.331; 73/862.08; 73/862.321; 73/862.325; 73/862.334; 73/862.335; 73/862.333; 73/862.336
(58) Field of Classification Search ............. 73/862.08, 73/862.321, 862.325, 862.331, 862.333, 73/862.334, 862.335, 862.336
See application file for complete search history.

(56) References Cited

U.S. PATENT DOCUMENTS

| | | | |
|---|---|---|---|
| 6,868,743 B2 * | 3/2005 | Nakane et al. | 73/862.331 |
| 6,880,411 B2 * | 4/2005 | Nakane et al. | 73/862.331 |
| 6,928,887 B2 * | 8/2005 | Nakane et al. | 73/862.331 |
| 6,928,888 B2 * | 8/2005 | Nakane et al. | 73/862.332 |
| 7,047,824 B2 * | 5/2006 | Nakane et al. | 73/862.331 |
| 7,051,602 B2 * | 5/2006 | Nakane et al. | 73/862.333 |
| 7,089,809 B2 * | 8/2006 | Nakane et al. | 73/862.331 |
| 7,191,669 B2 * | 3/2007 | Nakane et al. | 73/862.331 |
| 2002/0189371 A1 | 12/2002 | Nakane et al. | |
| 2003/0209087 A1 | 11/2003 | Nakane et al. | |
| 2004/0250631 A1 | 12/2004 | Pattok et al. | |

FOREIGN PATENT DOCUMENTS

| JP | 2003-149062 A | 5/2003 |
|---|---|---|
| JP | 2005-321361 A | 11/2005 |

* cited by examiner

*Primary Examiner*—Edward Lefkowitz
*Assistant Examiner*—Freddie Kirkland, III
(74) *Attorney, Agent, or Firm*—Darby & Darby

(57) ABSTRACT

In a torque detecting apparatus, in each of two flux concentrating rings, a portion along a circumferential direction is raised outward in a radial direction so that a flux concentrating section is provided that has a plate shape extending on one side in an axial direction. These flux concentrating rings are fixedly arranged such that the flux concentrating sections should oppose to each other in the circumferential direction with a predetermined gap in between. Leakage flux between opposing surfaces of the flux concentrating sections is detected by magnetic sensors aligned in an axial direction between these opposing surfaces. This improves the utilization of materials for the flux concentrating rings including the flux concentrating sections, and hence reduces the product cost.

2 Claims, 6 Drawing Sheets

TORQUE DETECTING APPARATUS

CROSS-REFERENCE TO RELATED APPLICATIONS

This Nonprovisional application claims priority under 35 U.S.C. § 119(a) on Patent Application No. 2005-12999 filed in Japan on Jan. 20, 2005, the entire contents of which are hereby incorporated by reference.

BACKGROUND OF THE INVENTION

The present invention relates to a torque detecting apparatus for detecting a steering torque applied to a steering member for steering in an electric power steering apparatus or the like.

In an electric power steering apparatus in which a motor for steering assist is driven in accordance with a rotation operation of a steering member such as a steering wheel so that the torque of the motor is transmitted to a steering mechanism and thereby assists the steering, the steering torque need be detected that is applied to the steering member for the driving control of the motor for steering assist. In the prior art, for the detection of the steering torque, a torque detecting apparatus is used that is arranged in the middle of a steering shaft that links the steering member and the steering mechanism.

In this torque detecting apparatus, a steering shaft serving as detection target is divided into a first shaft and a second shaft coaxially connected with each other through a torsion bar having a small diameter and serving as a torsion spring. When a steering torque is applied to the steering shaft by a rotation operation of the steering member, a relative angular displacement arises between the first and the second shafts in association with torsion in the torsion bar. Then, the steering torque is detected on the basis of the relative angular displacement.

The detection of the relative angular displacement between the first and the second shafts is implemented by various kinds of means in the prior art. In an example, a torque detecting apparatus comprises: a cylindrical permanent magnet that rotates integrally with the first shaft; and yoke rings that rotate integrally with the second shaft, so that a change is utilized that arises in a magnetic circuit between the cylindrical permanent magnet and the yoke rings (see, for example, Japanese Patent Application Laid Open No. 2003-149062).

In the yoke rings that rotate integrally with the second shaft, a plurality of magnetic pole claws extending in an axial direction on one side of each yoke body having a ring shape are arranged at equal intervals in a circumferential direction. Then, a pair of the yoke rings in which magnetic pole claws of these rings are arranged alternately in the circumferential direction are fixed to the second shaft. Further, the cylindrical permanent magnet that rotates integrally with the first shaft is a multi-pole magnet provided, in the circumferential direction, with magnetic pole groups of the same number as the magnetic pole claws groups of the yoke rings. The cylindrical permanent magnet is fixed to the first shaft in such a manner that in a neutral state where no relative angular displacement arises between the first and the second shafts, the magnetic pole claws of the yoke rings align on the boundaries between the N and S poles.

On the outside of the two yoke rings, flux concentrating rings for collecting the magnetic flux generated in these yoke rings are arranged such as to closely oppose respective yoke bodies. These flux concentrating rings have flux concentrating sections extending from each ring and opposing to each other with a predetermined gap in between. Then, a magnetic sensor composed of a magnetic detector element such as a Hall element is arranged in the gap between these flux concentrating sections.

In this configuration, when a steering torque is applied to the first shaft and the second shaft so that a relative angular displacement arises between these shafts, the positional relation in the circumferential direction between the magnetic pole claws of the two yoke rings and the magnetic poles of the cylindrical permanent magnet varies in the opposite direction with each other. Then, the change in the magnetic flux in the respective yoke rings in association with the positional change causes a change in the leakage flux in the gap between the flux concentrating sections of the flux concentrating rings. Accordingly, when a change in the output of the magnetic sensor in association with the above-mentioned change is extracted, a torque (steering torque) is detected that is applied to the first and the second shafts.

BRIEF SUMMARY OF THE INVENTION

FIG. 1 is an external appearance perspective view of a flux concentrating ring. As shown in the figure, a flux concentrating ring 9 is a ring composed of a magnetic material, and has branching pieces 90 and 90 extending in an axial direction at two places along a circumferential direction. The tips of these branching pieces 90 and 90 are bent outward in a radial direction, so that flux concentrating sections 91 and 91 are formed. The purpose of providing the two flux concentrating sections 91 and 91 is that the leakage flux from these sections is detected by separate magnetic sensors 92 and 92 arranged closely to each other so that on the basis of comparison of the two outputs, fail determination is performed in the magnetic sensors 92 and 92.

FIGS. 2A-2C are diagrams showing a fabrication procedure for a flux concentrating ring 9. In the fabrication of the flux concentrating ring 9, as shown in FIG. 2A, a material plate 9a having an appropriate thickness is used so that from this material plate 9a, a strip 9b is punched that has a shape corresponding to the flux concentrating ring 9 expanded in the circumferential direction and that has branching portions 9c and 9c corresponding to the branching pieces 90 and 90 in the middle. Then, the strip 9b extracted as shown in FIG. 2B is formed into a ring shape such that the two ends should align with each other. Further, the tips of the branching portions 9c and 9c are bent outward in the radial direction along a bending line indicated by a dash-dotted line in the figure, so that the flux concentrating ring 9 is obtained as shown in FIG. 2C.

In order to achieve that good flux concentrating performance, the flux concentrating ring 9 fabricated as described here is composed of an alloy material such as Permalloy (commercial name) having high permeability. Nevertheless, since this kind of alloy is expensive, improvement in the utilization of materials has been an important problem. FIG. 2A shows a method of plate cutting in which two strips 9b and 9b are punched from the material plate 9a. When two strips 9b having branching portions 9c and 9c in the middle are to be cut out as shown in the figure, the regions shaded in the figure are discarded as unnecessary regions. This causes the problem of reducing the utilization of materials.

The invention has been devised in view of this situation. An object of the invention is to provide a torque detecting apparatus capable of improving the utilization of materials for the flux concentrating rings including the flux concentrating sections, and hence of contributing to the reduction of product cost.

A torque detecting apparatus according to a first aspect of the invention is a torque detecting apparatus comprising: a cylindrical permanent magnet that rotates integrally with any one of a first shaft and a second shaft connected coaxially with each other; a pair of yoke rings that rotate integrally with the other one of the first shaft and the second shaft within a magnetic field formed by the cylindrical permanent magnet; a pair of flux concentrating rings that surround separately the outside of the yoke rings; and a magnetic sensor arranged between opposing surfaces of flux concentrating sections each provided in each of the flux concentrating rings, wherein on the basis of a density of leakage flux between the flux concentrating sections detected by the magnetic sensor, the apparatus detects a torque applied to the first shaft and the second shaft, and wherein the flux concentrating sections are formed such that a portion on a circumference of each of the flux concentrating rings is raised outward in a radial direction, thereby have a plate shape extending on one side in an axial direction, and thereby oppose to each other in a circumferential direction with a predetermined gap in between.

In the torque detecting apparatus according to the first aspect, one portion of each flux concentrating ring in the circumferential direction is raised outward in the radial direction so that a flux concentrating section is formed. This flux concentrating ring has a widened plate part at one end of the longitudinal direction, and hence can be fabricated from a strip that permits efficient plate cutting in the fabrication. This improves the utilization of materials in the fabrication, and hence reduces the product cost.

A torque detecting apparatus according to a second aspect of the invention is a torque detecting apparatus according to the first aspect, wherein a plurality of the magnetic sensors are arranged and aligned in an axial direction of the first shaft and the second shaft between the opposing surfaces of the flux concentrating sections.

In the torque detecting apparatus according to the second aspect, a plurality of magnetic sensors aligned in the axial direction of the first shaft and the second shaft are arranged between the flux concentrating sections opposing to each other in the circumferential direction with a gap in between. This permits fail determination in these magnetic sensors, and hence improves the reliability.

The above and further objects and features of the invention will more fully be apparent from the following detailed description with accompanying drawings.

DETAILED DESCRIPTION OF THE INVENTION

Figure 3:
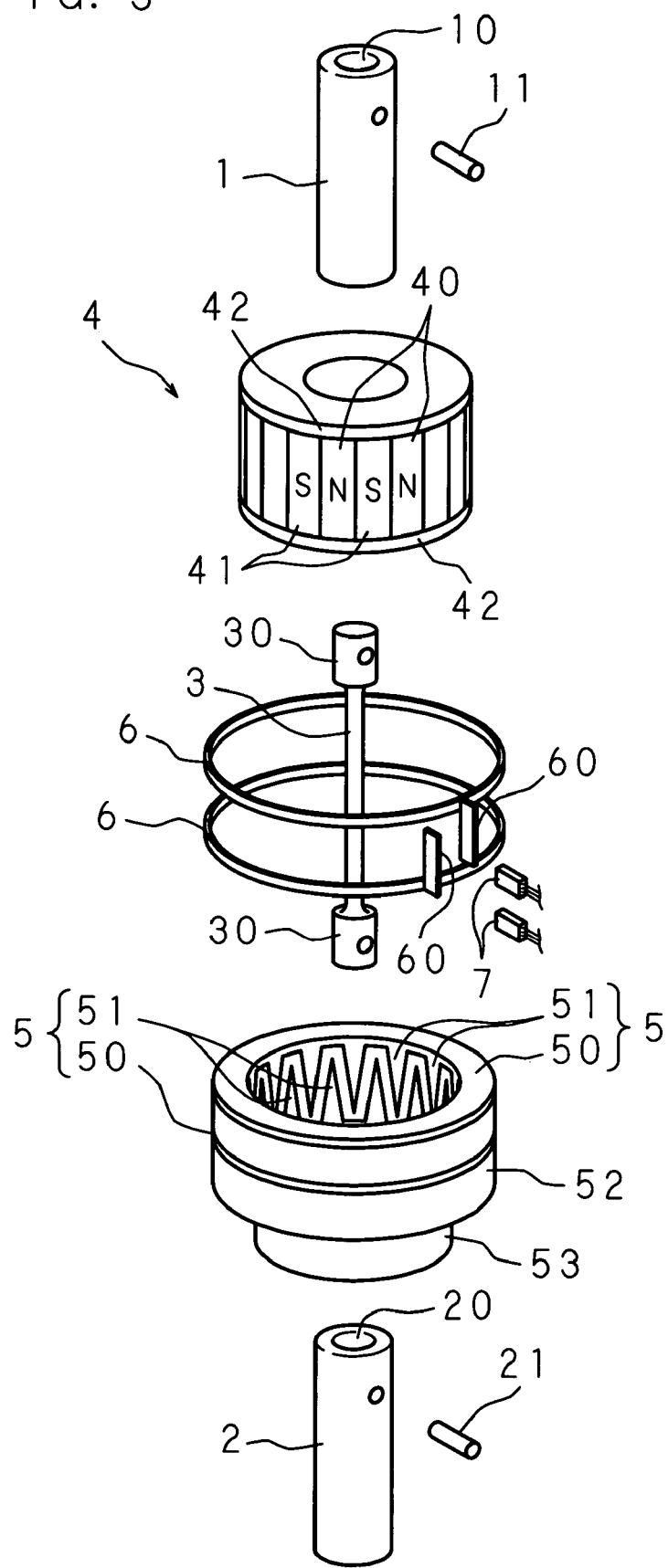
FIG. 3 is an exploded perspective view of a torque detecting apparatus according to the invention.
Figure 4:
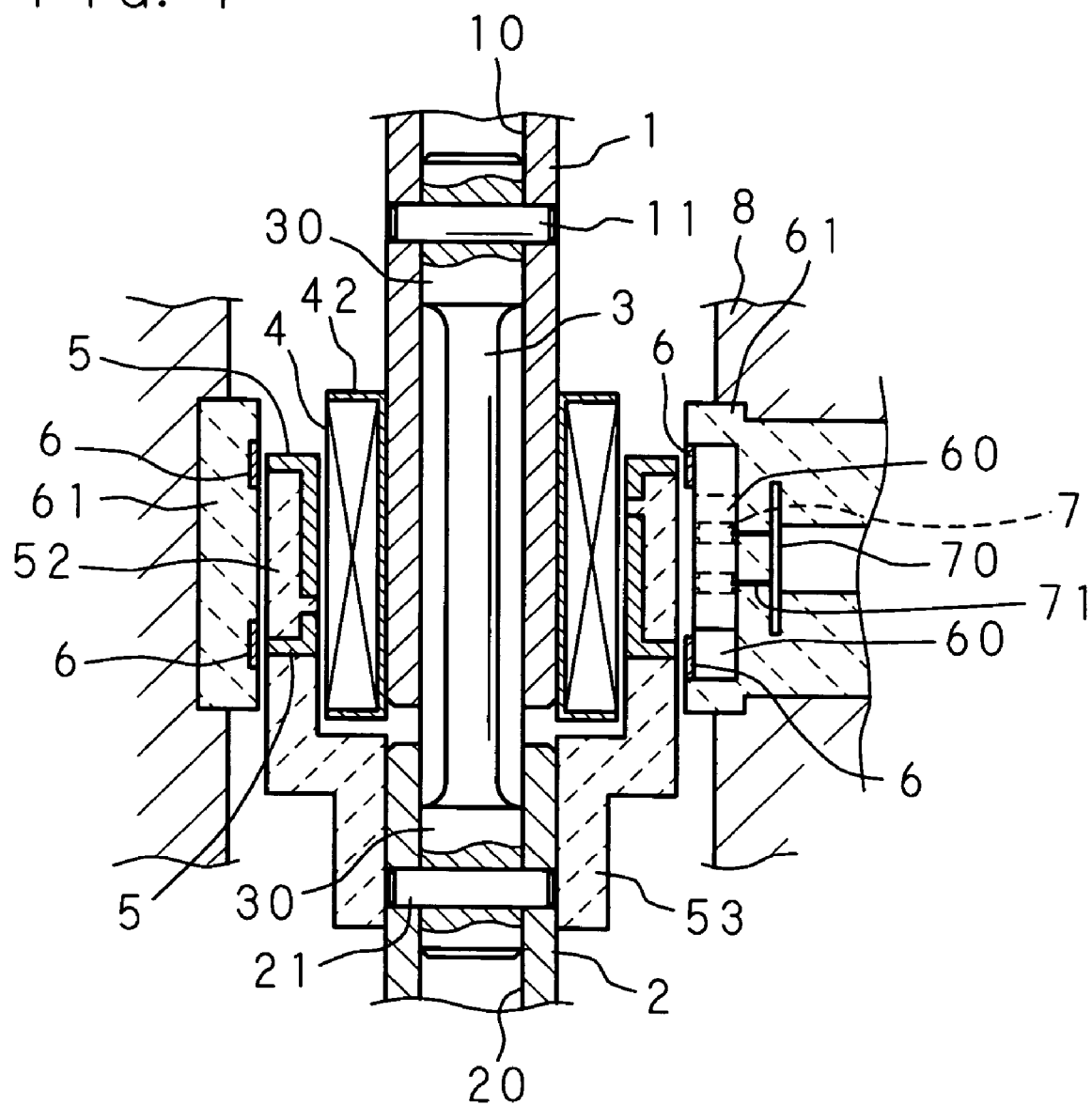
FIG. 4 is a vertical sectional view showing an assembled state of a torque detecting apparatus according to the invention.

The invention is described below in detail with reference to the drawings showing embodiments. FIG. 3 is an exploded perspective view of a torque detecting apparatus according to the invention. FIG. 4 is a vertical sectional view showing an assembled state.

The torque detecting apparatus according to the invention detects a torque applied to two shafts (a first shaft 1 and a second shaft 2) connected coaxially via a torsion bar 3, and comprises: a cylindrical permanent magnet 4 that rotates integrally with the first shaft 1; a pair of yoke rings 5 and 5 that rotate integrally with the second shaft 2; flux concentrating rings 6 and 6 that are arranged closely in a manner surrounding separately the outside of the yoke rings 5 and 5 and that thereby collect magnetic flux generated in the yoke rings 5 and 5; and two magnetic sensors 7 and 7 arranged between the flux concentrating rings 6 and 6 as described later.

In the torsion bar 3, connection sections 30 and 30 having a large diameter and a short length for linking with the first and the second shafts 1 and 2 are formed continuously at both ends of a rod having a small diameter serving as a torsion spring. The connection of the first shaft 1 with the second shaft 2 through the torsion bar 3 is achieved as follows. That is, the connection sections 30 and 30 at both ends of the torsion bar 3 are fit into connection holes 10 and 20 formed in the respective axial center portions. Then, positioning is performed in the circumferential direction as described later. After that, connection pins 11 and 21 are individually inserted and thereby integrate the components so that the connection is achieved. When a rotation torque is applied to the first shaft 1 and the second shaft 2 connected as described here, the torsion bar 3 suffers torsional deformation owing to the effect of the rotation torque, so that a relative angular displacement having a magnitude corresponding to the rotation torque arises between the first shaft 1 and the second shaft 2.

In the cylindrical permanent magnet 4 that rotates integrally with the first shaft 1, as shown in FIG. 3, a plurality of magnetic poles (a plurality of N poles 40, 40, . . . and a plurality of S poles 41, 41, . . . ) are aligned in the circumferential direction, while their inside and end faces are covered with a molding resin layer 42 having an appropriate thickness, so that a multi-pole magnet is formed. As shown in FIG. 4, the cylindrical permanent magnet 4 is fit and fixed over the first shaft 1 coaxially via the inner molding resin layer 42.

The yoke rings 5 and 5 that rotate integrally with the second shaft 2 are rings composed of magnetic material in which a plurality of magnetic pole claws 51, 51, . . . extending in the axial direction are arranged at equal intervals in the circumferential direction in the inner face of a yoke body 50 having a ring shape, as shown in FIG. 3. The magnetic pole claws 51, 51, . . . have a triangular shape narrowed toward the extending edge. The two yoke rings 5 and 5 are aligned in such a manner that the protruding ends of the magnetic pole claws 51, 51, . . . should oppose to each other while these magnetic pole claws should arranged alternately in the circumferential direction. The outside of these components are covered with a mold resin 52 formed in a cylindrical shape, so that these components are integrated.

The yoke rings 5 and 5 having the configuration described here are coaxially fit and fixed over the shaft end of the second shaft 2 via a boss section 53 formed by extending the mold resin 52 to one side. Thus, as shown in FIG. 4, the yoke rings 5 and 5 are assembled in such a manner that the inner surfaces of these rings should oppose, with a slight gap in between, the outer periphery surface of the cylindrical permanent magnet 4 fit and fixed over the first shaft 1.

Figure 5A:
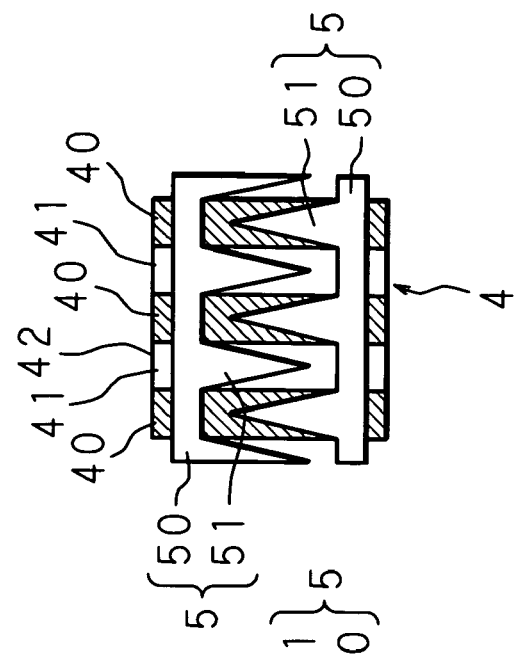
FIGS. 5A-5C are diagrams showing a positional relation in a circumferential direction between magnetic pole claws of yoke rings and magnetic poles of a cylindrical permanent magnet.
Figure 5B:
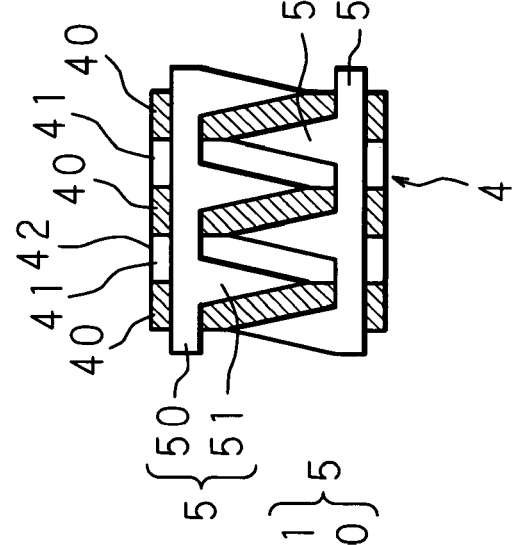
Figure 5C:
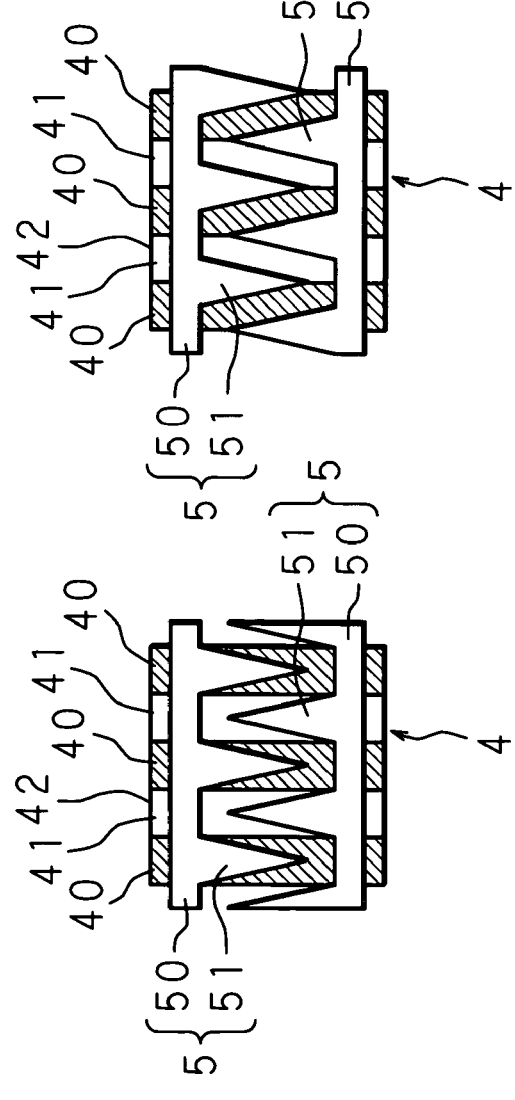

FIGS. 5A-5C are diagrams showing the positional relation in the circumferential direction between the magnetic pole claws 51, 51, . . . of the two yoke rings 5 and 5 and the N poles 40, 40, . . . and the S poles 41, 41, . . . of the cylindrical permanent magnet 4. FIG. 5B shows the positional relation at the time of assembling. As shown in this figure, the yoke rings 5 and 5 and the cylindrical permanent magnet 4 are positioned with each other in the circumferential direction in such a manner that the magnetic pole claws 51, 51, . . . align with the boundaries between the N poles 40, 40, . . . and the S poles 41, 41, . . . arranged along the circumference of the cylindrical permanent magnet 4. This positioning is achieved by adjusting the circumferential positions of the cylindrical permanent magnet 4 and the yoke rings 5 and 5 as well as the shafts 1 and 2, when the first shaft 1 is connected with the second shaft 2 by using the torsion bar 3.

In this assembled state, the magnetic pole claws 51, 51, . . . of the two yoke rings 5 and 5 are located under the same conditions in the magnetic field formed between each N pole 40 and each S pole 41 adjacent to each other on the circumference of the cylindrical permanent magnet 4. Thus, the magnetic flux becomes the same that is generated in the yoke bodies 50 and 50 for connecting the base of the magnetic pole claws 51, 51, . . . .

The positional relation between the magnetic pole claws 51, 51, . . . of the yoke rings 5 and 5 and the boundaries of the N poles 40, 40, . . . and the S poles 41, 41, . . . of the cylindrical permanent magnet 4 having implemented as described here varies in the opposite direction to each other as shown in FIG. 5A or 5C, depending on the relative angular displacement arising, in association with a torsion in the torsion bar 3, between the first shaft 1 to which the cylindrical permanent magnet 4 is fixed and the second shaft 2 to which the yoke rings 5 and 5 are fixed. When this displacement arises, magnetic lines of force having the opposite polarity increase respectively in the magnetic pole claws 51, 51, . . . of one yoke ring 5 and the magnetic pole claws 51, 51, . . . of the other yoke ring 5. Thus, positive magnetic flux and negative magnetic flux are generated respectively in the yoke bodies 50 and 50. The polarity of the magnetic flux generated at that time depends on the direction of the relative angular displacement arising between the cylindrical permanent magnet 4 and the yoke rings 5 and 5, that is, between the first shaft 1 and the second shaft 2. The density of the positive or negative magnetic flux depends on the magnitude of the relative angular displacement.

As described above, the feature of the torque detecting apparatus according to the invention is the configuration of the flux concentrating rings 6 and 6 for collecting the magnetic flux generated in the yoke rings 5 and 5. These flux concentrating rings 6 and 6 are rings composed of magnetic material having an inner diameter slightly larger than the outer diameter of the yoke body 50, and provided, at one portion along the circumferential direction, with plate-shaped flux concentrating sections 60 and 60 raised outward in the radial direction and extending on one side in the axial direction.

Such flux concentrating rings 6 and 6 are arranged coaxially in such a manner that the extending sides of the flux concentrating sections 60 and 60 should oppose to each other, and are positioned such that these flux concentrating sections 60 and 60 should oppose to each other in the circumferential direction with a predetermined air gap in between. Further, these components are integrated with a mold resin 61 formed in a cylindrical shape covering the outside, and then retained, via the mold resin 61, in the inside of a housing 8 a part of which is shown in FIG. 4. Then, the assembling is completed in such a manner that the inner periphery surfaces of the flux concentrating rings 6 and 6 closely oppose the outer periphery surfaces of the yoke bodies 50 and 50 of the yoke rings 5 and 5.

Magnetic sensors 7 and 7 composed of magnetic detector elements such as Hall elements are arranged between the flux concentrating sections 60 and 60 of the flux concentrating rings 6 and 6 assembled as described above. These magnetic sensors 7 and 7 are supported in a protruding manner by separate leads 71 and 71, on a surface of a common circuit board 70 provided with peripheral circuits such as a power supply circuit and a signal processing circuit. The magnetic sensors 7 and 7 are embedded into the mold resin 61 together with the circuit board 70, and aligned with an appropriate interval in the axial direction of the first shaft 1 and the second shaft 2, within the gap formed between the flux concentrating sections 60 and 60.

According to the above-mentioned configuration, magnetic flux generated in the inside of the yoke bodies 50 and 50 is guided respectively to the closer flux concentrating rings 6 and 6, thereby collected in the respective flux concentrating sections 60 and 60, and then leaks into the gap formed between the flux concentrating sections 60 and 60. The magnetic sensors 7 and 7 generate outputs corresponding to the density of magnetic flux leaking into the gap between the flux concentrating sections 60 and 60, so that the outputs are extracted to the outside through the circuit board 70.

The flux density detected by the magnetic sensors 7 and 7 as described here varies depending on the magnetic flux generated inside the yoke bodies 50 and 50 opposing the flux concentrating rings 6 and 6. The generated magnetic flux corresponds to the relative angular displacement relative to the cylindrical permanent magnet 4, that is, the relative angular displacement between the first shaft 1 and the second shaft 2, as described above. Thus, the outputs of the magnetic sensors 7 and 7 correspond to the direction and the magnitude of the rotation torque applied to the first shaft 1 and the second shaft 2 and thereby causing the relative angular displacement. Accordingly, on the basis of a change in the outputs of the magnetic sensors 7 and 7, the rotation torque is detected that is applied to the first shaft 1 and the second shaft 2.

Among the two magnetic sensors 7 and 7 arranged between the flux concentrating sections 60 and 60, one sensor is used for the torque detection described above, while the other one is used for fail determination. The fail determination is performed by a publicly known procedure in which the outputs of the magnetic sensors 7 and 7 are compared with each other as time advances, and in which when a clear difference arises between these, for example, a magnetic sensor 7 that outputs an instable output before and after that timing is determined as in a fail state.

Figure 1:
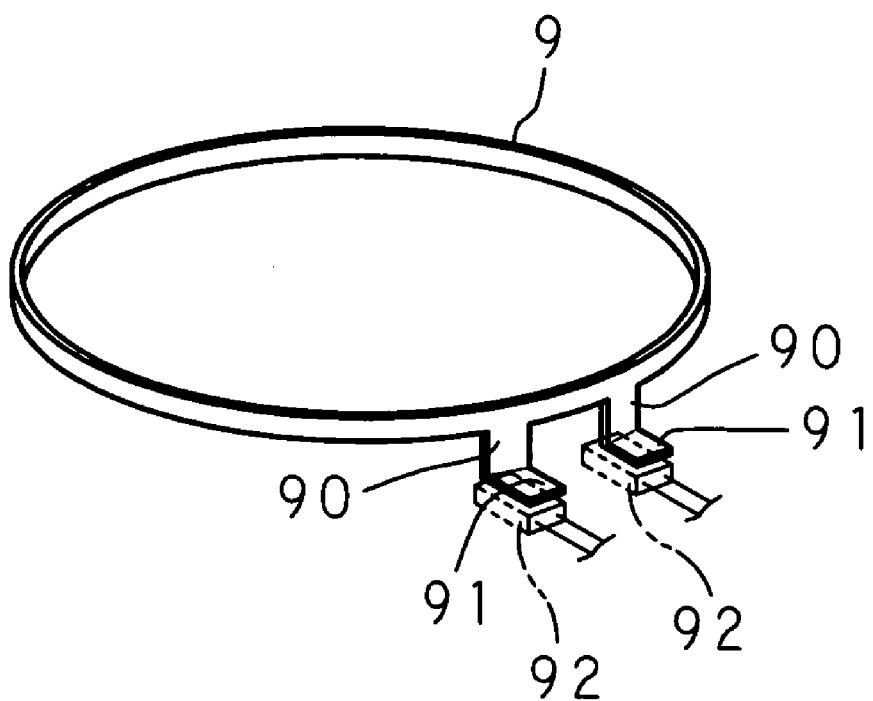
FIG. 1 is an external appearance perspective view of a prior art flux concentrating ring.
Figure 2A:
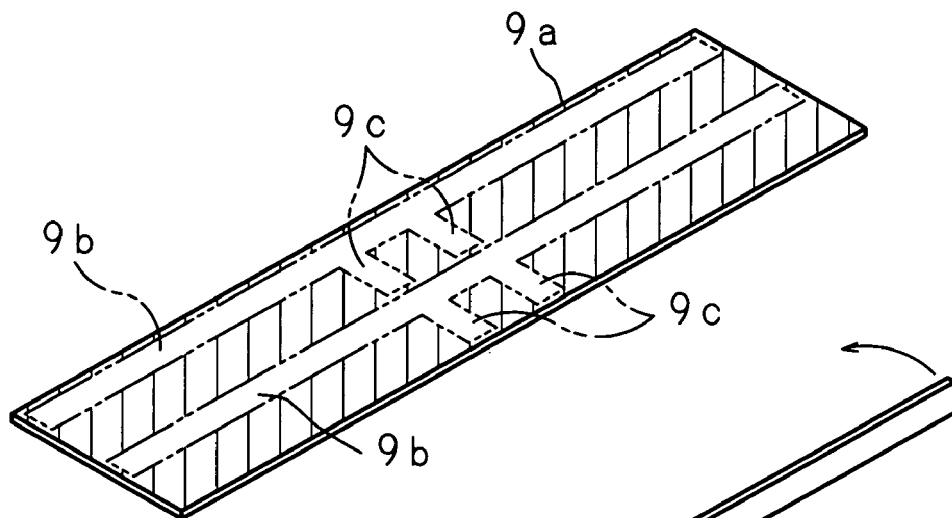
FIGS. 2A-2C are diagrams showing a fabrication procedure for the flux concentrating ring shown in FIG. 1.
Figure 2B:
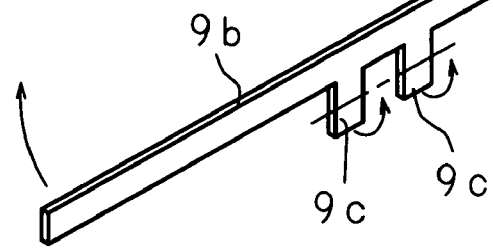
Figure 2C:
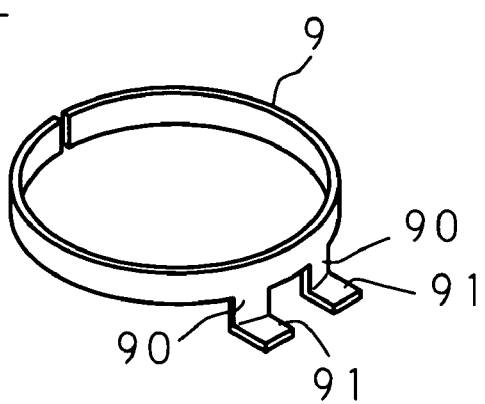
Figure 6A:
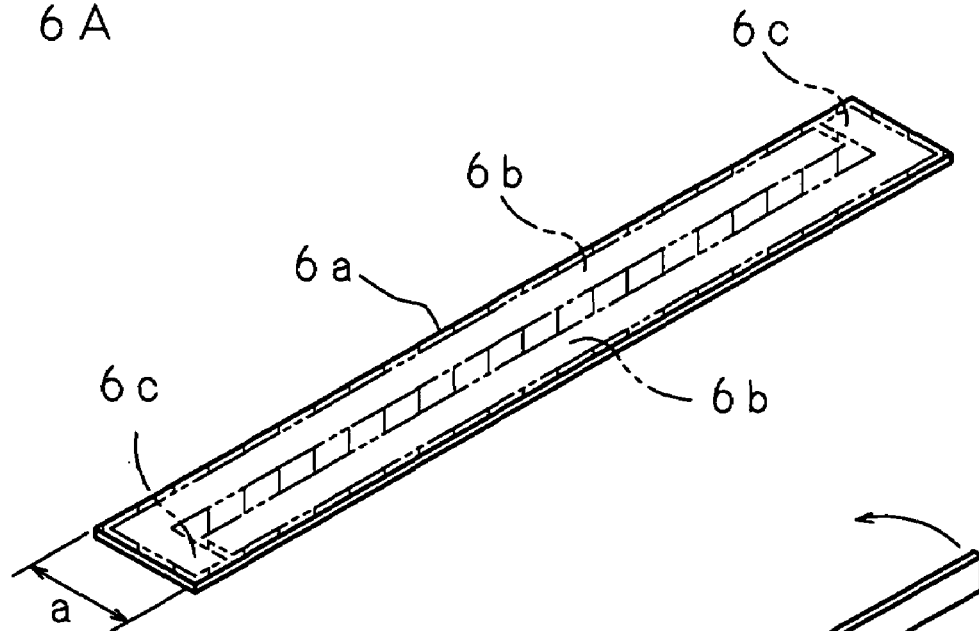
FIGS. 6A-6C are diagrams showing a fabrication procedure for a flux concentrating ring used in a torque detecting apparatus according to the invention.
Figure 6B:
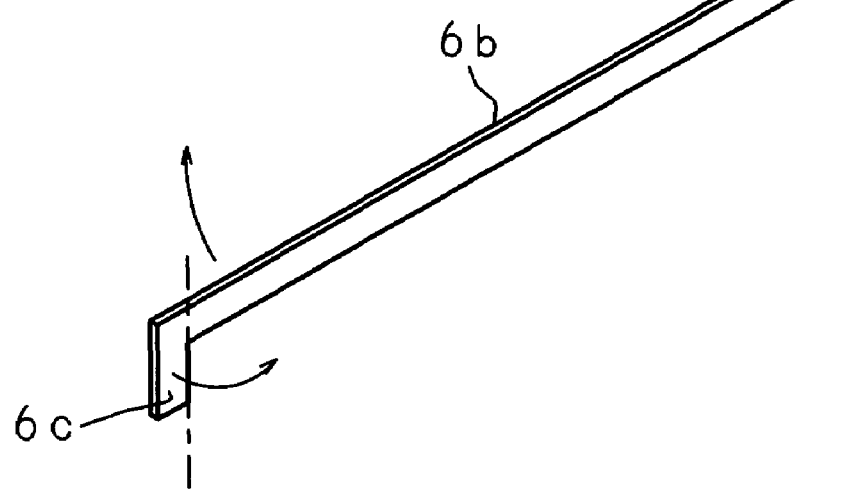
Figure 6C:
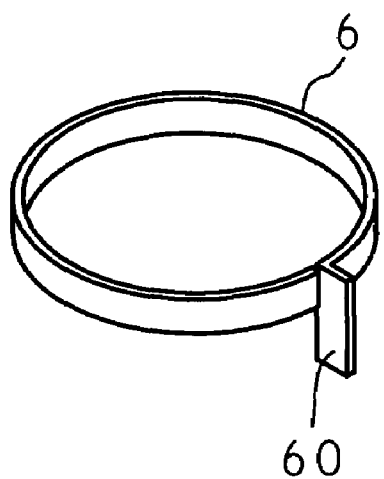

FIGS. 6A-6C are diagrams showing a fabrication procedure of a flux concentrating ring 6 used in a torque detecting apparatus according to the invention. The fabrication of the flux concentrating ring 6 is performed similarly to the prior art procedure shown in FIGS. 2A-2C. As shown in FIG. 6A, a material plate 6a having an appropriate thickness is used so that a strip 6b having a shape corresponding to a flux concentrating ring 6 expanded in the circumferential direction is punched from the material plate 6a. Then, the strip 6b extracted as shown in FIG. 6B is bent into a ring shape such that the two ends should align with each. As a result, a flux concentrating ring 6 shown in FIG. 6C is obtained.

Here, the flux concentrating section 60 provided in the flux concentrating ring 6 has a shape in which one portion along the circumferential direction is raised outward in the radial direction as described above. Such a flux concentrating section 60 is formed as follows. That is, in the plate cutting for the strip 6b on the material plate 6a, as shown in FIG. 6A, a plate part 6c formed by expanding one side of the width direction is provided integrally at one end of the longitudinal direction of the strip 6b. Then, in the subsequent process of bending the strip 6b, the plate part 6c is bent approximately at right angles along a bending line indicated by a dash-dotted line in FIG. 6B.

FIG. 6A shows a plate cutting method in which two strips 6b and 6b are punched from the material plate 6a. As shown in the figure, when two strips 6b each having the plate part 6c at one end are to be cut out, the plate part 6c of one strip 6b can be cut out from an extended portion provided in an appropriate length in the outside of the other end of the other strip 6b. Thus, in the fabrication of the flux concentrating rings 6 according to the invention, an unnecessary portion after the punching of the material plate 6a is restricted to the region shaded in the figure. Thus, in comparison with the fabrication procedure for the prior art flux concentrating rings 9 shown in FIGS. 2A-2C, the width "a" of the material plate 6a can be reduced. This improves remarkably the utilization of materials.

The material employed for the flux concentrating ring 6 is a high magnetic permeability alloy such as Permalloy as described above. This kind of alloy is expensive. Thus, in the invention, a flux concentrating section 60 is formed by raising one portion along the circumferential direction, outward in the radial direction. This improves the utilization of materials as described above, and hence reduces the product cost.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A torque detecting apparatus comprising:
   a cylindrical permanent magnet that rotates integrally with any one of a first shaft and a second shaft connected coaxially with each other;
   a pair of yoke rings that rotate integrally with the other one of the first shaft and the second shaft within a magnetic field formed by the cylindrical permanent magnet;
   a pair of flux concentrating rings that surround separately the outside of the yoke rings; and
   a magnetic sensor arranged between opposing surfaces of flux concentrating sections each provided in each of the flux concentrating rings, wherein
   on the basis of a density of leakage flux between the flux concentrating sections detected by the magnetic sensor, the apparatus detects a torque applied to the first shaft and the second shaft, and wherein
   the flux concentrating sections are formed such that a portion on a circumference of each of the flux concentrating rings is raised outward in a radial direction, thereby have a plate shape extending on one side in an axial direction, and thereby oppose to each other in a circumferential direction with a predetermined gap in between.

2. The torque detecting apparatus according to claim 1, wherein a plurality of the magnetic sensors are arranged and aligned in an axial direction of the first shaft and the second shaft between the opposing surfaces of the flux concentrating sections.

* * * * *

UNITED STATES PATENT AND TRADEMARK OFFICE
CERTIFICATE OF CORRECTION

| | |
|---|---|
| PATENT NO. | : 7,293,472 B2 |
| APPLICATION NO. | : 11/332714 |
| DATED | : November 13, 2007 |
| INVENTOR(S) | : Yoshitomo Tokumoto et al. |

It is certified that error appears in the above-identified patent and that said Letters Patent is hereby corrected as shown below:

On the title page, item [73]:

Please insert --Denso Corporation, Kariya-Shi, Aichi, Japan--.

Signed and Sealed this

Sixteenth Day of September, 2008

JON W. DUDAS
*Director of the United States Patent and Trademark Office*